US008860785B2

(12) United States Patent
Ji et al.

(10) Patent No.: US 8,860,785 B2
(45) Date of Patent: Oct. 14, 2014

(54) STEREO 3D VIDEO SUPPORT IN COMPUTING DEVICES

(75) Inventors: Gang Ji, Bothell, WA (US); Shijun Sun, Redmond, WA (US); Yongjun Wu, Bellevue, WA (US); Shyam Sadhwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 12/972,292

(22) Filed: Dec. 17, 2010

(65) Prior Publication Data

US 2012/0154526 A1 Jun. 21, 2012

(51) Int. Cl.
*H04N 13/04* (2006.01)
*H04N 13/00* (2006.01)

(52) U.S. Cl.
CPC ....... *H04N 13/0431* (2013.01); *H04N 13/0007* (2013.01); *H04N 13/0438* (2013.01); *H04N 13/0037* (2013.01)
USPC .......................................................... 348/43

(58) Field of Classification Search
None
See application file for complete search history.

(56) References Cited

U.S. PATENT DOCUMENTS

| 6,759,998 | B2 | 7/2004 | Schkolnik | |
|---|---|---|---|---|
| 2005/0259147 | A1 | 11/2005 | Nam | |
| 2007/0263007 | A1* | 11/2007 | Robotham et al. | 345/581 |
| 2008/0278574 | A1 | 11/2008 | Ramstad | |
| 2008/0279449 | A1* | 11/2008 | Ramstad | 382/154 |
| 2009/0085912 | A1 | 4/2009 | Scott | |
| 2009/0207167 | A1* | 8/2009 | Pasetto | 345/419 |
| 2010/0111417 | A1 | 5/2010 | Ward et al. | |
| 2010/0111489 | A1* | 5/2010 | Presler | 386/52 |
| 2010/0208044 | A1 | 8/2010 | Robinson et al. | |
| 2010/0303442 | A1* | 12/2010 | Newton et al. | 386/241 |

FOREIGN PATENT DOCUMENTS

CN 101897195 A 11/2010

OTHER PUBLICATIONS

"3D Stereoscopic Anaglyph Videos Collection search result," downloaded from http://www.downeu.com/d/3D+Stereoscopic+Anaglyph+Videos+Collection.html, 17 pp. (document not dated, downloaded on Oct. 11, 2010).
Kerr, "Chrominance Subsampling in Digital Images," Issue 2, 11 pages, (document dated Dec. 3, 2009, downloaded Oct. 8, 2010).
"Stereoscopic 3D Video in the Home," downloaded from http://www.spectracal.com/3D%20Video%20Basics2.pdf, 5 pp. (document not dated, downloaded on Oct. 8, 2010).

(Continued)

*Primary Examiner* — Sath V Perungavoor
*Assistant Examiner* — Kate Luo
(74) *Attorney, Agent, or Firm* — Timothy Churna; Kate Drakos; Micky Minhas (57) ABSTRACT

Methods are disclosed for supporting stereo 3D video in computing devices. A computing device can receive stereo 3D video data employing a YUV color space and chroma subsampling, and can generate anaglyph video data therefrom. The anaglyph video data can be generated by unpacking the stereo 3D video data to left and right views and combining the left and right views into a single view via matrix transformation. The combining uses transform matrices that correspond to a video pipeline configuration. The transform matrix coefficients can depend on characteristics of the video pipeline components. Modified transform matrix coefficients can be used in response to changes in the video pipeline configuration. Video encoded in stereo 3D video data can be selected to be displayed in stereo 3D, anaglyph or monoscopic form, depending on user input and/or characteristics of video pipeline components.

20 Claims, 7 Drawing Sheets

(56) References Cited

OTHER PUBLICATIONS

Wiegand et al., "Overview of the H.264/AVC Video Coding Standard," *IEEE Trans. on Circuits and Systems for Video Tech.*, vol. 13, No. 7, pp. 560-576 (Jul. 2003).

Woods et al., "Comparing Levels of Crosstalk with Red/Cyan, Blue/Yellow, and Green/Magenta Anaglyph 3D glasses," *Proceedings of SPIE Stereoscopic Displays and Applications XXI*, vol. 7253, pp. 0Q1-0Q12 (Jan. 2010).

Woods et al., "Ghosting in Anaglyphic Stereoscopic Images," *Stereoscopic Displays and Virtual Reality Systems XI, Proceedings of SPIE-IS&T Electronic Imaging*, vol. 5291, San Jose, California, 12 pp. (2004).

Office Action from Chinese Patent Application No. 201110423070.4, dated Dec. 3, 2013, 7 pages.

* cited by examiner

STEREO 3D VIDEO SUPPORT IN COMPUTING DEVICES

FIELD

The present disclosure pertains to video processing devices and methods. More particularly, the present disclosure relates to methods of supporting stereo 3D video in computing devices.

BACKGROUND

Demand for three-dimensional (3D) video content has increased over the past several years with the increasing availability of 3D video content and the ability to generate such content. For example, the number of 3D movies, television shows and video games available has greatly increased over what was available just a few years ago, and many new video capture devices available on the market have 3D capture capabilities.

Various stereoscopic technologies can be employed to allow a user to experience 3D video. Most 3D video technologies require the user to wear a set of glasses that allow each eye to receive images slightly offset from those received by the other eye. The brain blends the two images together and interprets the differences between them as being the result of different distances, thus creating the illusion of depth. One conventional 3D video technology employs displaying anaglyph images, in which two differently filtered color images are superimposed on one another to produce the depth effect. Anaglyph video is viewed with glasses comprised of left and right lenses of different colors corresponding to the color layers in the displayed anaglyph images. One form of anaglyph glasses is the well-known white cardboard frame glasses comprising red and blue lenses, which have been used by moviegoers for well over half a century. The blue lens lets a red image through to one eye and the red lens lets a blue image through to other eye. The illusion of depth is created by the offset between the red and blue images.

In another stereoscopic technology, stereo 3D technology, images intended for the left eye and right eye are alternatively shown on a display in rapid succession. Stereo 3D video is viewed with shutter glasses that alternatively make the left and right lenses of the glasses go opaque and transparent in synchronization with the display of left and right images on the display. That is, the left lens is transparent and the right lens is opaque when a left image is displayed, and the left lens is opaque and the right lens is transparent when a right image is displayed. Again, the left and right images are slightly offset from one another to create the illusion of depth.

One reason anaglyph 3D video has been widely used for so long is its low cost. Anaglyph glasses are relatively inexpensive and anaglyph video can be shown on conventional displays with conventional video cards. In contrast, shutter glasses can cost an order of magnitude or more than anaglyph glasses and high-end displays and premium video cards may be needed to display and process frames at the increased frame rate needed to display stereo 3D video. Besides increased cost, another disadvantage of stereo 3D video is that shutter glasses are often matched to a particular brand or type of display. Shutter glasses matched with one display may not allow viewing of stereo 3D video on other displays.

Regardless, demand for stereo 3D is strong as stereo 3D video can provide higher color quality than anaglyph video. Shutter glasses typically allow substantially the entire color spectrum to be transmitted to each eye and thus do not suffer from the "ghosting" or "crosstalk" that can occur with anaglyph glasses. However, not all users may want to spend the money for stereo 3D video hardware. Thus, there is a need to provide users with the ability to view 3D video from a stereo 3D video source using conventional technology.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Methods are disclosed for supporting stereo 3D video in computing devices. If a computing device receives stereo 3D video for output at a display, the device passes the stereo 3D video data to the display if the display is capable of displaying stereo 3D video. If not, the processor generates anaglyph video (e.g., non-stereo 3D video) or monoscopic video (e.g., 2D video) for display.

In one embodiment, a video processor can generate anaglyph video data by combining left and right views unpacked from stereo 3D video data into a single anaglyph view. The stereo 3D video data can employ a YUV color scheme and chroma subsampling, such as 4:2:0 or 4:2:2 chroma subsampling. Anaglyph video data can be generated by performing a matrix transform on the left and right views. The transform matrices can correspond to a video pipeline configuration, and the transform matrix coefficients can depend on characteristics of components within the pipeline, such as display, video capture device and viewing glasses characteristics. Original equipment manufacturers can supply modified anaglyph transform matrix coefficients that are tuned to specific video components used in different video pipeline configurations. These modified anaglyph transform matrix coefficients can be supplied to the computing device and used in generating anaglyph video data.

In another embodiment, the user can select the format of the video output at the display. The selected video display format can be stereo 3D, anaglyph or monoscopic video. This selection can be based on characteristics of a display or viewing glasses, or user input. The user can select a video display format in response to a query presented by the computing device, or independent of device prompt.

The foregoing and other objects, features and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Figure 1:
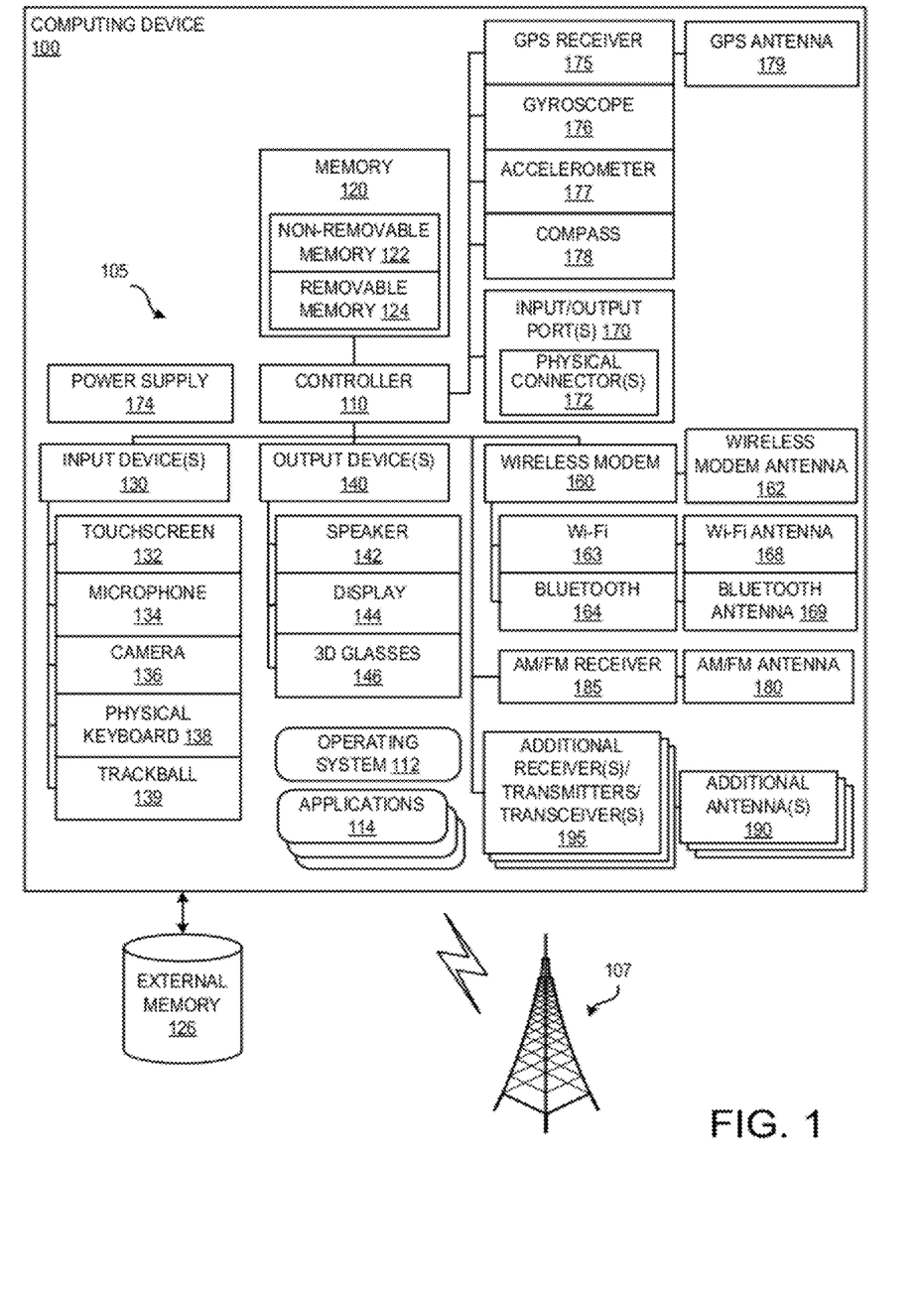
FIG. 1 is a system diagram depicting an exemplary computing device.

FIG. 1 is a system diagram depicting an exemplary computing device 100 that can be used to perform any of the methods described herein. Generally, components 105 in the computing device 100 can communicate with other components, although not all connections are shown, for ease of illustration. The computing device 100 can include a variety of optional hardware and software components 105. The computing device can be any of a variety of mobile or non-mobile computing devices (e.g., smartphone; handheld, netbook, notebook, tablet or desktop computer; Personal Digital Assistant (PDA); server) and can allow wireless two-way communications with one or more mobile communications networks 107, such as a cellular or satellite network.

The illustrated computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs can include common mobile computing applications (e.g., email applications, calendars, contact managers, web browsers, messaging applications), or any other computing application.

The illustrated computing device 100 can include memory 120. Memory 120 can include non-removable memory 122 and removable memory 124. The non-removable memory 122 can include RAM, ROM, flash memory, a hard drive, or other well-known memory storage technologies. The removable memory 124 can include flash memory cards (e.g., SD (Secure Digital) cards), memory sticks, a Subscriber Identity Module (SIM) card, which is well known in GSM (Global System for Mobile Communication) systems, or other well-known memory storage technologies, such as "smart cards." The memory 120 can be used for storing data and/or computer-executable instructions for running the operating system 112 and the applications 114. Example data can include web pages, text, images, sound files, video data or other data sets to be sent to and/or received from one or more network servers or other devices by the computing device 100 via the one or more wired or wireless networks 107. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory 126, which can comprise, for example, an external hard drive or any memory store accessible to the computing device 100 over a wired or wireless local or network connection.

The computing device 100 can support one or more input devices 130, such as a touch screen 132, microphone 134, camera 136, physical keyboard 138 and trackball 139 and one or more output devices 140, such as a speaker 142, a display 144 and 3D viewing glasses 146 (e.g., anaglyph or shutter glasses). The camera 136 can be a video capture device capable of capturing and generating 3D images or video. Other possible output devices (not shown) can include piezoelectric or other haptic output devices. Any of the input devices 130 and output devices 140 can be internal to, external to, or removably attachable with, the computing device 100. External input and output devices 130 and 140 can communicate with the computing device 100 via wired or wireless network connections. Some devices can serve more than one input/output function. For example, touch screen 132 and display 144 can be combined in a single input/output device.

A wireless modem 160 can be coupled to a wireless modem antenna 162 and can support two-way communications between the computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the computing device and a public switched telephone network (PSTN).

The computing device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175, a gyroscope 176, an accelerometer 177 and a compass 178. The GPS receiver 175 can be coupled to a GPS antenna 179. The computing device 100 can additionally include an AM/FM antenna 180 coupled to an AM/FM receiver 185 for receiving radio signals broadcast by an AM/FM radio signal transmitter. The computing device 100 can further include one or more additional antennas 190 coupled to one or more additional receivers, transmitters and/or transceivers 195 to enable various additional functions. For example, computing device 100 can include an additional antenna 190 coupled to an additional receiver 195 configured to receive and process a digital audio radio service (DARS) signal for output at the computing device 100 or an attached accessory.

Although the various antennas are shown as separate hardware components of the computing device 100, they can be incorporated into other components. For example, GPS antenna 179 can be incorporated into the GPS receiver 175. In addition, antennas shown as separate in FIG. 1 can be implemented as a single antenna. For example, the AM/FM antenna 180 and the GPS antenna 179 can be a single antenna shared by GPS receiver 175 and AM/FM receiver 185. Furthermore, multiple antennas can be connected to a switch to allow a component to be coupled to one of several antenna sources, or to more than one antenna source. For example, the AM/FM receiver 185 can be connected to a switch (not shown) that allows either the AM/FM antenna 180 or an antenna external to the computing device 100 to be used as the AM/FM receiver antenna source. The switch can also be configured to allow both the AM/FM antenna 180 and an external antenna, or multiple external antennas to be simultaneously used as antenna sources for the AM/FM receiver 185.

The illustrated components 105 are not required or all-inclusive, as any components can be deleted and other components can be added.

Figure 2:
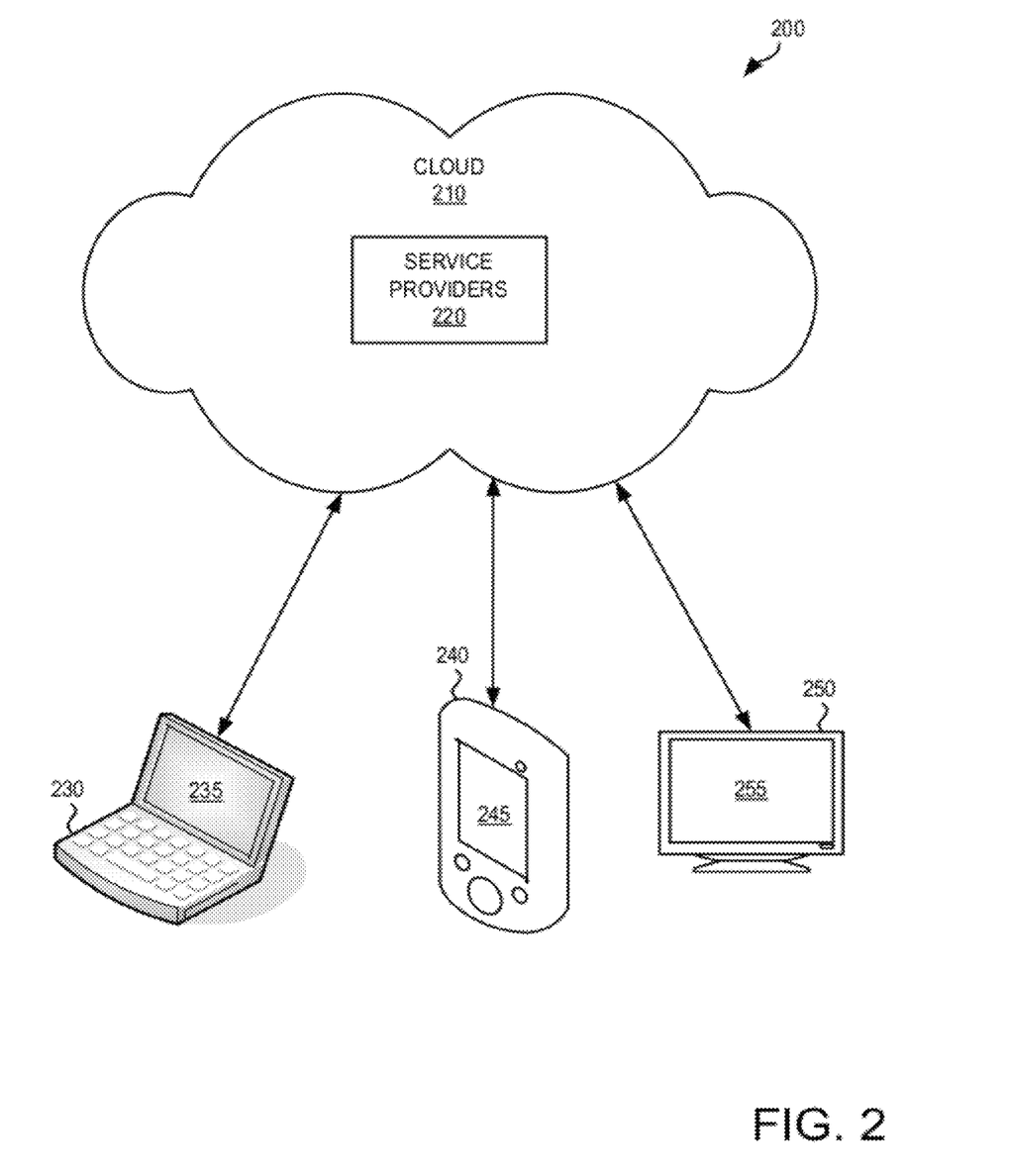
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer display 235 (e.g., a mid-size display). For example, connected device 230 could be a desktop, laptop, notebook, netbook or tablet computer or the like. Connected device 240 represents a computing device with a computing device display 245 (e.g., a small-size display). For example, connected device 240 could be a mobile phone, smart phone, personal digital assistant or the like. Connected device 250 represents a device with a large display 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without display capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the display size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking, website hosting and the provision of 3D video content. The service providers can host online marketplaces offering wide varieties of goods and services such as software applications and upgrades and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
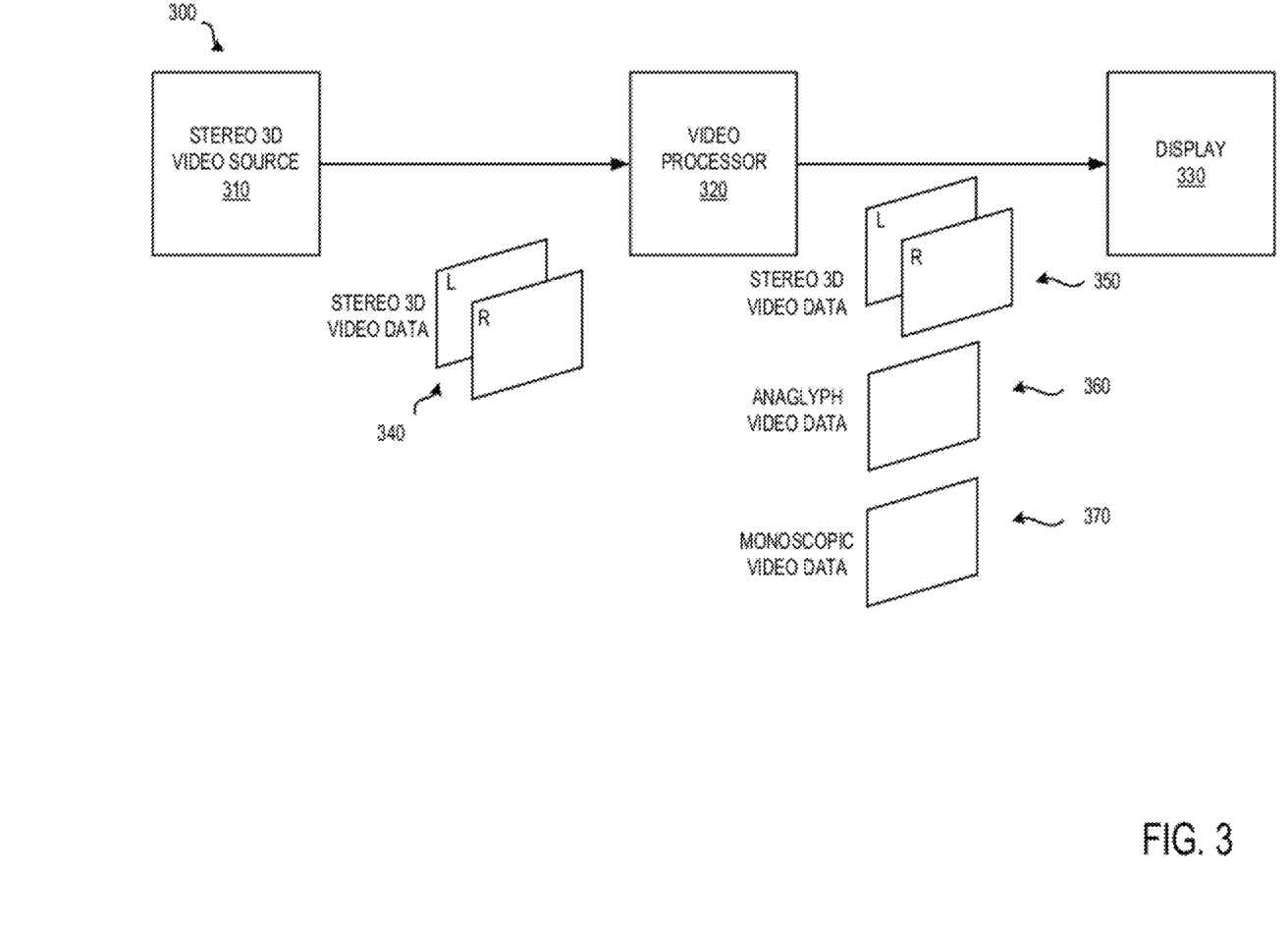
FIG. 3 is a block diagram of an exemplary video pipeline.

FIG. 3 shows a block diagram of an exemplary video pipeline 300 that can be used to implement the various methods described herein. The video pipeline 300 comprises a stereo 3D video source 310, a video processor 320 and a display 330. Any video pipeline component can be internal or external to a specific computing device. For example, a video recorder, the video processor 320 and the display 330 can be integrated into a laptop computer, tablet computer or smartphone. In another example, the video processor 320 can be internal to a desktop computer, the stereo 3D video source can be a portable handheld video recorder connectable to the desktop computer, and the display 330 can be external to the desktop. In still another example, a stereo 3D video source (e.g., a webcam) 310 can be integrated into a laptop computer, the video processor 320 can be a service provided by a cloud-based service provider, and the display 330 can be a remote display relative to the laptop computer, such as a television. Although not shown, 3D viewing glasses (e.g., shutter glasses, anaglyph glasses) are also considered part of the video pipeline.

The stereo 3D video source 310 can be a source that provides or generates stereo 3D video data 340. The stereo 3D video source 310 can be, for example, a video capture device such as a handheld camera, video recorder or webcam, internal or external memory, or a cloud-based service provider. Stereo 3D video data 340 and 350 can be a data that can be used for generating separate left and right images that, when viewed on a display, create the illusion of depth. Stereo 3D video data 340 and 350 can be used to generate time-multiplexed left and right images that are alternatively displayed on the display 330 in rapid succession, or to generate spatially-multiplexed left and right images that are displayed simultaneously and adjacent to each other (i.e., the left and right images are displayed side-by-side (horizontally tiled) or one above the other (vertically tiled)).

The stereo 3D video data 340 and 350 can conform to any stereo 3D video standard. For example, the stereo 3D video data 340 and 350 can conform to the H.264/MPEG-4 Part 10 codec standard, which uses a YUV color space and employs chroma subsampling. As used herein, a YUV color space refers to any color space that can be described in terms of a single brightness component (Y) and two color components (UV). Thus, a YUV color space can refer, for example, to YCbCr, YPbPr color spaces and to any number of YUV pixel formats such as YUY2, NV12, UVUY, etc. In addition, each YUV component can represent a value that is or is not gamma-compressed. For example, a YUV color space can refer to Y'UV color space in which the brightness component is a luma value Y' which is a gamma-compressed version of a luminance value Y.

Video compression standards that employ chroma subsampling, such as the H.264 standard, take advantage of the fact that the human eye is more sensitive to changes in brightness than to changes in color to encode color video at a reduced bitrate. Generally, a chroma subsampling scheme can be expressed as a three-part ratio J:a:b that describes the number of luma and chroma samples in a conceptual region J pixels wide and 2 pixels high. In general, "a" represents the number of chroma samples taken in the first row of pixels in the conceptual region, and "b" represents the number of additional chroma samples in the second row of pixels.

FIGS. 4(a)-4(e) show various chroma sampling schemes and chroma sampling arrangements for a conceptual region 4 pixels wide (J=4) and 2 pixels wide, the conceptual region size typically used in describing chroma sampling schemes. Image pixels, the pixels that are part of an image output at a display, are represented by boxes with thin lines. Chroma sampling regions, the regions in which a single chroma sample is taken, are represented by boxes with thick lines. The dots indicate where a chroma sample is taken within a chroma sample region. In FIGS. 4(a)-4(d), the chroma sampling regions are aligned with the image pixels. That is, the chroma sampling region boundaries coincide with image pixel boundaries. In each chroma sampling scheme, eight luma samples are taken within a 4×2 pixel conception region, one for each image pixel.

Figure 4A:
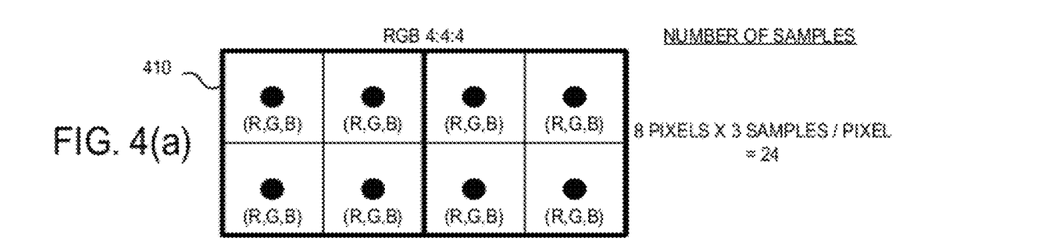
FIGS. 4(a)-4(e) show various chroma sampling schemes and chroma sampling arrangements.

FIG. 4(a) shows a 4:4:4 chroma sampling scheme 410, such as that used in an encoding employing the RGB color space. In an RGB encoding, red, green and blue samples are taken at each image pixel. Four chroma samples are taken along the first row of the conceptual region, and another four chroma samples are taken along the second row of the conceptual region. Thus, for each 4:4:4 conceptual region, three color samples are taken at eight locations for a total of 24 samples.

Figure 4B:
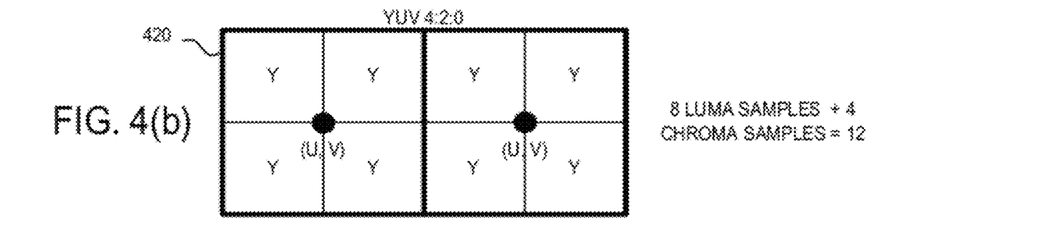

FIG. 4(b) shows a 4:2:0 chroma subsampling scheme 420 used in an encoding using a YUV color space. In a 4:2:0 chroma subsampling, two chroma samples are taken along the first row of pixels, and no additional chroma samples are taken in the second row of pixels. Thus, four chroma samples (2 U,V chroma sample pairs) are taken in each conceptual region, a first U,V chroma sample pair for the four left-most image pixels, and a second U,V chroma sample pair for the four right-most image pixels. Thus, twelve total samples are taken in the 4:2:0 chroma subsampling scheme for each 4×2 pixel region—8 luma samples and 4 chroma samples.

Figure 4C:
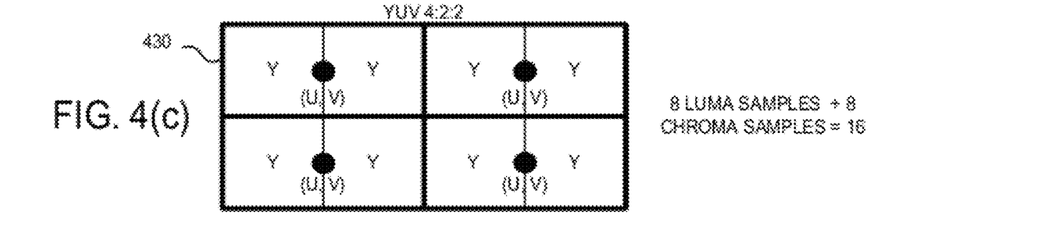

FIG. 4(c) shows a 4:2:2 chroma subsampling scheme 430. Two chroma samples are taken along the first row of the conceptual region, and an additional two chroma samples are taken along the second row of the conceptual region. Thus, eight chroma samples (4 U,V chroma sample pairs) are taken in each eight-pixel region, giving a total of 16 samples—8 luma samples and 8 chroma samples.

Accordingly, the 4:2:0 and 4:2:2 chroma subsampling schemes allow images and video to be represented with one-half and two-thirds the number of bits, respectively, relative to that needed in a 4:4:4 chroma sample scheme. Thus, video data encoded using a YUV color space and chroma subsampling provides for the delivery of color images or video at a reduced bitrate relative to video data encoded using the RGB color space.

FIGS. 4(a)-4(c) show "centered" chroma sampling arrangements in which chroma samples are taken at the centroid of their respective chroma sampling regions. For example, with reference to FIG. 4(b), the U,V samples are taken in the center of the chroma sampling region, which is at the middle of the four corresponding image pixels. Other, "non-centered" chroma sampling arrangements exist, and the methods described herein can work with any chroma sampling arrangement.

Figure 4D:
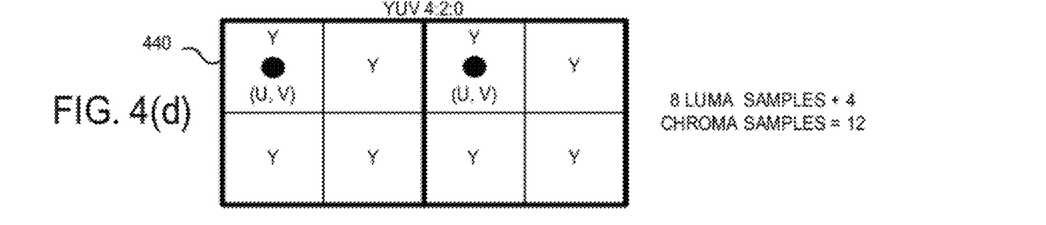
Figure 4E:
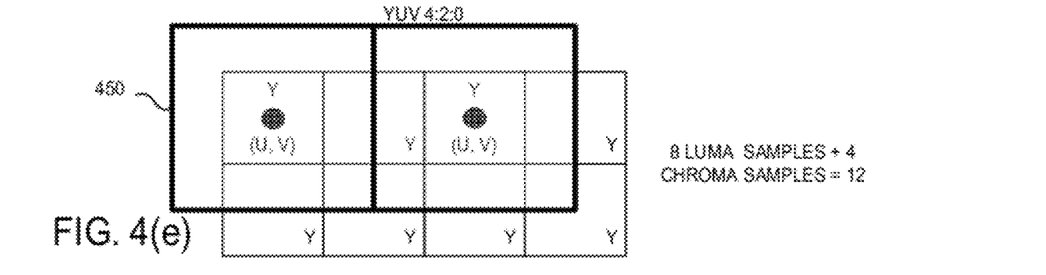

FIG. 4(d) shows a non-centered chroma sampling arrangement 440 for a 4:2:0 chroma subsampling scheme in which the chroma samples are taken in the upper left-most image pixel within a chroma sampling region. Although FIGS. 4(a)-4(d) show chroma sampling schemes in which the chroma sampling regions are aligned with image pixels, the methods described herein can be used with "non-aligned" chroma sampling arrangements. Chroma sampling regions can be offset from image pixels, such as the chroma sampling arrangement 450 shown in FIG. 4(e).

The video processor 320 is capable of receiving stereo 3D video data 340, generating anaglyph video data 360 or monoscopic video data 370 from the stereo 3D video data 340, and transmitting stereo 3D video data 350, anaglyph video data 360 or monoscopic video data 370 to the display 330. The video processor 320 can be implemented in hardware or software and can be integrated into a computing device or display 330, or be provided by a cloud-based service. Within a computing device, the video processor can be integrated into the controller 110 or the operating system 112, or be a stand-alone hardware or software component.

The video processor 320 can detect that received video data comprises stereo 3D video 340 data by examining the contents of the received video data. For example, the video processor 320 can comprise an H.264 decoder that determines whether the received data is H.264 compliant. If the video processor 320 detects H.264-compliant video, it can look to any supplemental enhancement information (SEI) to gain additional information about the data. For example, SEI with payload 22 contains stereo video information and SEI with payload 25 contains frame packing information. These payloads can provide information about the stereo 3D nature of the video data such as which field or frame is for which view (left/right).

The video processor 320 can also process stereo 3D video data conforming to Multiview Video Coding (MVC) features of the H.264 standard. Multiview Video Coding is an amendment to the H.264 standard that allows for the encoding of video captured simultaneously from multiple cameras. Multiview Video Coding comprises the Multiview High Profile, which supports an arbitrary number of views, and the Stereo High Profile, which supports two views.

The video processor 320 can receive user input indicating information about the stereo 3D video data 340 and 350. For example, if the video processor 320 passes stereo 3D video data 350 to the display 330, and a viewer sees two videos arranged adjacent to each other, the viewer can provide this information to the computing device through a user interface. For example, the user can provide input to the computing device indicating that the display 330 is showing videos that are horizontally or vertically tiled.

In addition to receiving video data and detecting the presence of stereo 3D video data, the video processor can select a video data format to be used when transmitting video data to the display 330. For example, the video processor 320 can select stereo 3D, anaglyph or monoscopic video format. If the video processor selects stereo 3D video, the video processor can pass the received stereo 3D video data 340 through to the display 330 in the same stereo 3D video format, or convert the received stereo 3D video data 340 to another stereo 3D video format. As used herein, the term "video data format" refers to a format of data encoding video, while the term "video display format" refers to the format of the video output at a display. Thus, for example, data encoding video in a stereo 3D video data format can be used to generate video that is output at a display in a stereo 3D video display format.

Alternatively, the video processor 320 can select a non-stereo 3D video display format (e.g., anaglyph or monoscopic) for display in a video encoded in stereo 3D video data 340. The video processor 320 can make this selection based on, for example, capabilities of the display 330 and/or user input 340. For example, the video processor 320 can select the video display format based on whether the display 330 is capable of displaying stereo 3D video.

Stereo 3D video may not be able to be output at a display 330 for various reasons. For example, the display 330 may not have a high enough refresh rate for displaying time-multiplexed stereo 3D video. Also, other hardware or software component in the video pipeline 300 downstream from the video processor (e.g., video card, device drivers) may not support stereo 3D video. The video processor 320 can determine whether stereo 3D video can be viewed at the display 330 by querying these downstream components of their abilities, or by being notified by a downstream component that an attempt to process stereo 3D video for output at the display 330 has failed. For example, the video processor 320 can attempt to allocate and prepare output video buffers before processing a stereo 3D video frame. If the video processor 320 is unable to allocate stereo 3D video buffers due to hardware or software shortcomings of the video pipeline, it can determine that stereo 3D video cannot be output at the display 330.

In addition, the video processor 320 can select a video display format based on whether 3D viewing glasses are within communication range of the computing device or display 330. For example, stereo 3D viewing glasses can be configured to transmit data to the display 330 or a computing device indicating that the glasses are within communication range of the display. The glasses could send this signal at various times such when the glasses are turned on, at periodic intervals or in response to receiving synchronization signals from the display 330.

The video processor can also select a video display format based on user input. In some embodiments, the computing device can query a user to select a video display format at the display 330. If stereo 3D video can be output at the display 330, the query can ask the user to select from among two or more of the following video display formats: stereo 3D, anaglyph or monoscopic video. If stereo 3D video cannot be displayed at the display 330, the query can ask the user to select between anaglyph and monoscopic video. The query can be presented to the user at the display 330 or at any user interface accessible to the computing device. The query can be made when, for example, the video processor 320 first receives stereo 3D video data 340, or each time stereo 3D video data 340 is received. In addition, the user can select a video display format in individual software applications or by setting system-level parameters such as a parameter of the operating system. Further, the user can select a video display format without being queried by the computing device. For example, a user watching 3D video by himself can select monoscopic video if several friends arrive and there are not enough 3D viewing glasses to go around, and then select anaglyph or stereo 3D video after his friends leave. If anaglyph or monoscopic video is selected, the video processor 320 converts the stereo 3D video data 340 to anaglyph video data 360 or monoscopic video 370. If stereo 3D video data is selected, the video processor passes the stereo 3D video data 340 through to the display 330 as stereo 3D video data 350.

Figure 5:
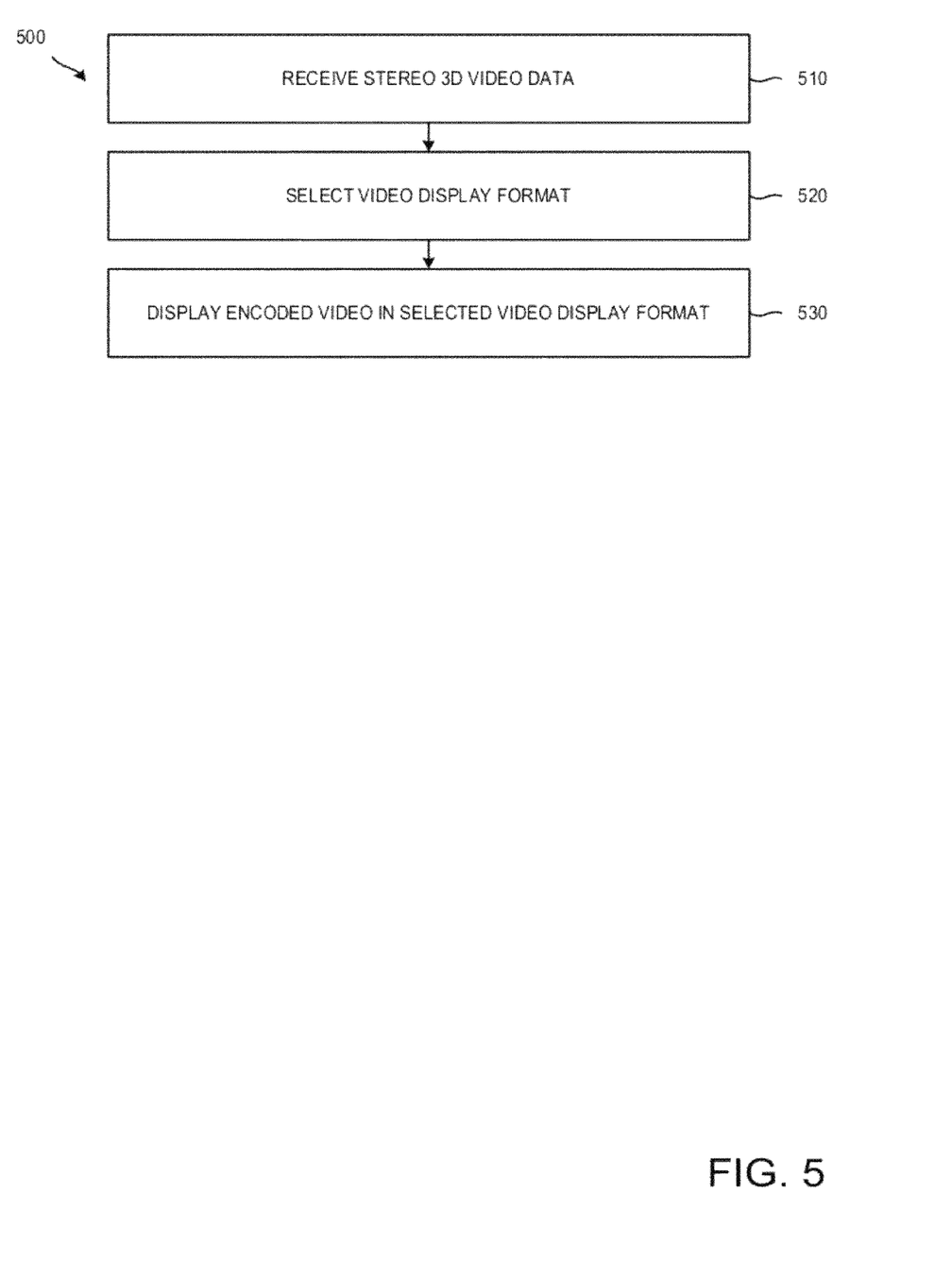
FIG. 5 is a flowchart of an exemplary method of selecting a video display format.

FIG. 5 is a flowchart of an exemplary method 500 for selecting a video display format. The method 500 can be executed, for example, by a laptop computer outputting 3D video captured by an external video recorder on a television. At 510, stereo 3D video data employing a YUV color space is received at a computing device. In the example, the laptop computer receives stereo 3D video data captured by a video recorder. The received video data can be "live" video streamed from the recording device or stored video data previously captured. The stereo 3D video is encoded using a YUV color space. At 520, the video display format is selected from at least two of the following formats: stereo 3D video, anaglyph video and monoscopic video. In the example, the user selects anaglyph video from among a list of stereo 3D, anaglyph and monoscopic video display formats presented to him as a query shown at the laptop display or the television. At 530, the video encoded in the stereo 3D video data is displayed in the selected video display format. In the example, the video captured by the video capture device is displayed to the user at the television in anaglyph form.

Figure 6A:
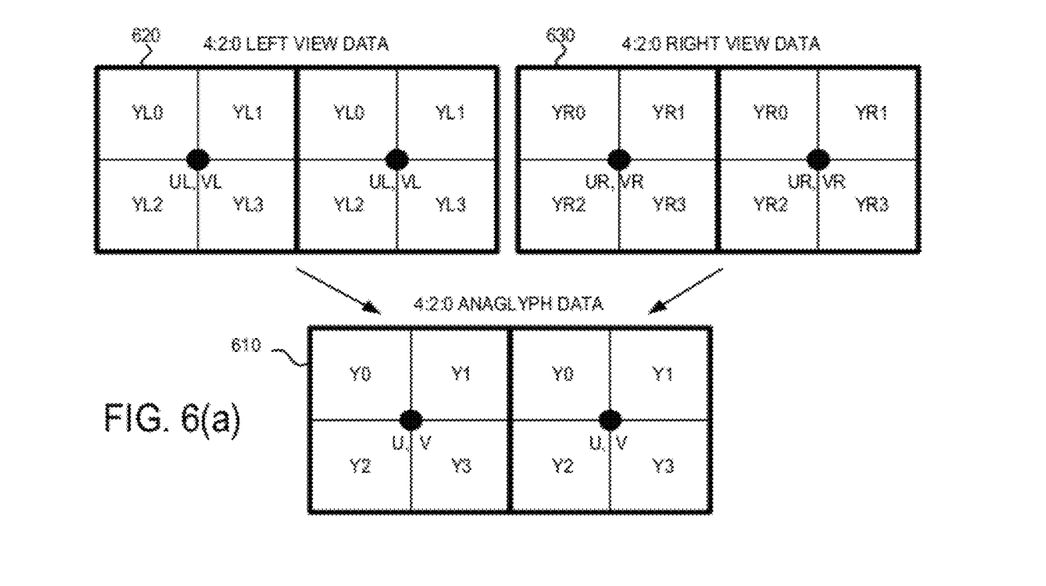
FIGS. 6(a)-6(b) show exemplary generation of anaglyph video data from stereo 3D video data using 4:2:0 and 4:2:2 chroma subsampling.

FIG. 6(*a*) shows an exemplary generation of anaglyph video data 610 from stereo 3D data employing a YUV color space and 4:2:0 chroma subsampling. A video processor can generate the YUV 4:2:0 anaglyph video data 610 by unpacking the stereo 3D video YUV 4:2:0 data to left view data 620 and right view data 630 and then combining the left and right view data 620 and 630 into a single anaglyph view, or anaglyph video data 610. The YUV 4:2:0 anaglyph data 610 can generated using the following equation:

$$\begin{pmatrix} Y0 \\ Y1 \\ Y2 \\ Y3 \\ U \\ V \end{pmatrix} = ML\_420 \begin{pmatrix} YL0 \\ YL1 \\ YL2 \\ YL3 \\ UL \\ VL \end{pmatrix} + MR\_420 \begin{pmatrix} YR0 \\ YR1 \\ YR2 \\ YR3 \\ UR \\ LR \end{pmatrix},$$

Wherein YL0-YL3 are luma samples of the left view; UL and VL are chroma samples of the left view; YR0-YR3 are luma samples of the right view; UR and VR are chroma samples of the right view, Y0-Y3 are luma samples of the anaglyph video data; and U and V are chroma samples of the anaglyph video data; ML_420 and MR_420 are anaglyph transform matrices having the form:

$$Mx\_420 = \begin{pmatrix} a & 0 & 0 & 0 & b & c \\ 0 & a & 0 & 0 & b & c \\ 0 & 0 & a & 0 & b & c \\ 0 & 0 & 0 & a & b & c \\ d0 & d1 & d2 & d3 & e & f \\ g0 & g1 & g2 & g3 & h & i \end{pmatrix},$$

wherein a, b, c, d0-d3, e, f, g0-g3, h and i are anaglyph transform matrix coefficients. The resulting YUV 4:2:0 anaglyph video data 610 can have the correct minimum display aperture as well as pixel aspect ratio to be displayed correctly on the display. In the case of Multiview Video Coding, there is no need to adjust the pixel aspect ratios. The correct rendering of the anaglyph frames can depend on the rendering engine to honor aspect ratios and other flags contained in the video data for the frames. The d0-d3 and g0-g3 transform matrix coefficients depend on the chroma sampling arrangement. In some embodiments, the chroma values are scaled to be in the [−128,127] range.

In one embodiment, the following ML_420 and MR_420 anaglyph transform matrices can be used for generating anaglyph video data from stereo 3D video encoded using the ITU-R (International Telecommunication Union Radiocommunication Sector) Recommendation BT.709 color gamut:

$$M_{L420} = \begin{pmatrix} 0.13 & 0 & 0 & 0 & 0.025 & 0.043 \\ 0 & 0.13 & 0 & 0 & 0.025 & 0.043 \\ 0 & 0 & 0.13 & 0 & 0.025 & 0.043 \\ 0 & 0 & 0 & 0.13 & 0.025 & 0.043 \\ -0.027 & -0.027 & -0.027 & -0.027 & 0.0072 & -0.042 \\ 0.18 & 0.18 & 0.18 & 0.18 & 0.18 & 0.24 \end{pmatrix}$$

$$M_{R420} = \begin{pmatrix} 0.86 & 0 & 0 & 0 & 0.10 & 0.14 \\ 0 & 0.86 & 0 & 0 & 0.10 & 0.14 \\ 0 & 0 & 0.86 & 0 & 0.10 & 0.14 \\ 0 & 0 & 0 & 0.86 & 0.10 & 0.14 \\ 0.027 & 0.027 & 0.027 & 0.027 & 1.26 & -0.083 \\ -0.18 & -0.18 & -0.18 & -0.18 & -0.085 & -0.11 \end{pmatrix}$$

The anaglyph transform matrices (e.g., ML_420, MR_420) can correspond to a specific video pipeline configuration. A video pipeline configuration corresponds to a combination of video pipeline components and settings of these components. For example, one video pipeline configuration can correspond to a stereo 3D video source, display and viewing glasses combination supplied with a laptop computer. The anaglyph transform matrix coefficients can depend on characteristics of components within a video pipeline configuration. For example, the anaglyph transform matrix coefficients can be based on one or more of the following: chroma sampling scheme, chroma sampling arrangement, video capture device characteristics, display characteristics and viewing glasses characteristics. For example, different video capture devices and displays can have different color gamuts, anaglyph glasses can have lenses of various color combinations (e.g., red-blue, red-green, red-cyan, green-magenta), and video capture devices can sample chroma values using various chroma sampling arrangements and can have varying color gamuts.

The anaglyph transform matrix coefficients can be set to default or modified coefficients. The default coefficients can correspond to general values that work for a range of video pipeline components, or for a default video pipeline configuration (e.g., a video pipeline configuration supplied with a computing device). For example, an OEM (original equipment manufacturer) desktop computer manufacturer can determine a set of default anaglyph transform matrix coefficients that account for the color gamuts or spectrums used by a display and a camera integrated into the desktop.

The modified coefficients can correspond to a change in a video pipeline configuration. That is, any change in the chroma sampling scheme, chroma sampling arrangement, stereo 3D video source, display or viewing glasses can result in modified anaglyph transform matrix coefficients being used to generate anaglyph video data. These modified coefficients can be supplied, for example, by the stereo 3D video source, display or glasses (e.g., stored in memory in these components and provided to the computing device upon connection of a component to the computing device) or by the computing device accessing the cloud and downloading the modified coefficient coefficients from an OEM or retailer web site.

The modified coefficients can be supplied by a user, an application, the operating system, a display, viewing glasses or stereo 3D video source accessing application program interfaces (APIs) exposed by the video processor 320. The default or modified coefficients can also be supplied by setting operating system parameters accessible to the video processor 320. In some embodiments, no translation or mapping is needed to make the modified coefficients compatible with the specific stereo 3D video data to anaglyph video data conversion. For example, for the generation of anaglyph YUV 4:2:0 video data from stereo 3D YUV 4:2:0 video data, the modified coefficients comprise one or more of the coefficients a, b, c, d0-d3, e, f, g0-g3, h and i used in the ML_420 and MR_420 transform matrices described above.

Modified anaglyph transform matrix coefficients can be provided from multiple sources. For example, one or more modified coefficients can be supplied due to a stereo 3D video source change and one or more other modified coefficients could be provided due to a display change. Moreover, multiple modified coefficients can be provided for a single anaglyph transform matrix coefficient. For example, a change in the display and a change in the viewing glasses can result in modified coefficients being supplied for the same anaglyph transform matrix coefficient. In this case, the video processor can generate a new modified coefficient based on the multiple modified coefficients received.

The video processor 320 can map default or modified anaglyph transform matrix coefficients for use in generating anaglyph video data using a first color space and chroma sampling combination to coefficients for use in generating anaglyph video data using a second color space and chroma sampling combination. For example, if the video processor 320 is supplied with coefficients for use in generating anaglyph video using a YUV color space and 4:4:4 chroma sampling combination from stereo 3D video data that uses a YUV color space and 4:4:4 chroma sampling as well, the anaglyph video data can be generated according to the $$\begin{pmatrix} Y \\ U \\ V \end{pmatrix} = \text{ML\_444} \begin{pmatrix} YL \\ UL \\ VL \end{pmatrix} + \text{MR\_444} \begin{pmatrix} YR \\ UR \\ VR \end{pmatrix},$$

wherein YL, UL and VL are chroma samples of stereo 3D left view data; YR, UR and VR are chroma samples of the stereo 3D right view data; Y, U and V are chroma samples of the anaglyph video data; and ML_444 and MR_444 are anaglyph transform matrices having the form:

$$\text{Mx\_444} = \begin{pmatrix} a & b & c \\ d & e & f \\ g & h & i \end{pmatrix},$$

wherein a-i are anaglyph transform matrix coefficients.

The video processor 320 can transform the Mx_444 transform matrix coefficients to Mx_420 transform matrix coefficients for generating anaglyph video data using 4:2:0 chroma subsampling. The transformation can accounting for the differences in the 4:4:4 and 4:2:0 chroma sampling schemes and the chroma sampling arrangement used. For example, generation of the Mx_420 transform matrix chroma coefficients (d0-d3, e, f, g0-g3, h and i) includes scaling the Mx_444 chroma transform matrix coefficients downward to account for the fact that each 4:2:0 chroma sample corresponds to four 4:4:4 chroma samples. In some embodiments, the sum of the Mx_420 chroma coefficients add up to their corresponding Mx_444 chroma coefficient (i.e., d0+d1+d2+d3=d; g0+g1+g2+g3=g). If the Mx_444 and Mx_420 matrix coefficients correspond to chroma sampling arrangements in which the chroma samples are taken at the center of the chroma sampling regions, then d0=d1=d2=d3=d/4 and g0=g1=g2=g3=g/4. The values of d0-d3 and g0-g3 can vary with different chroma sampling arrangements.

Figure 7:
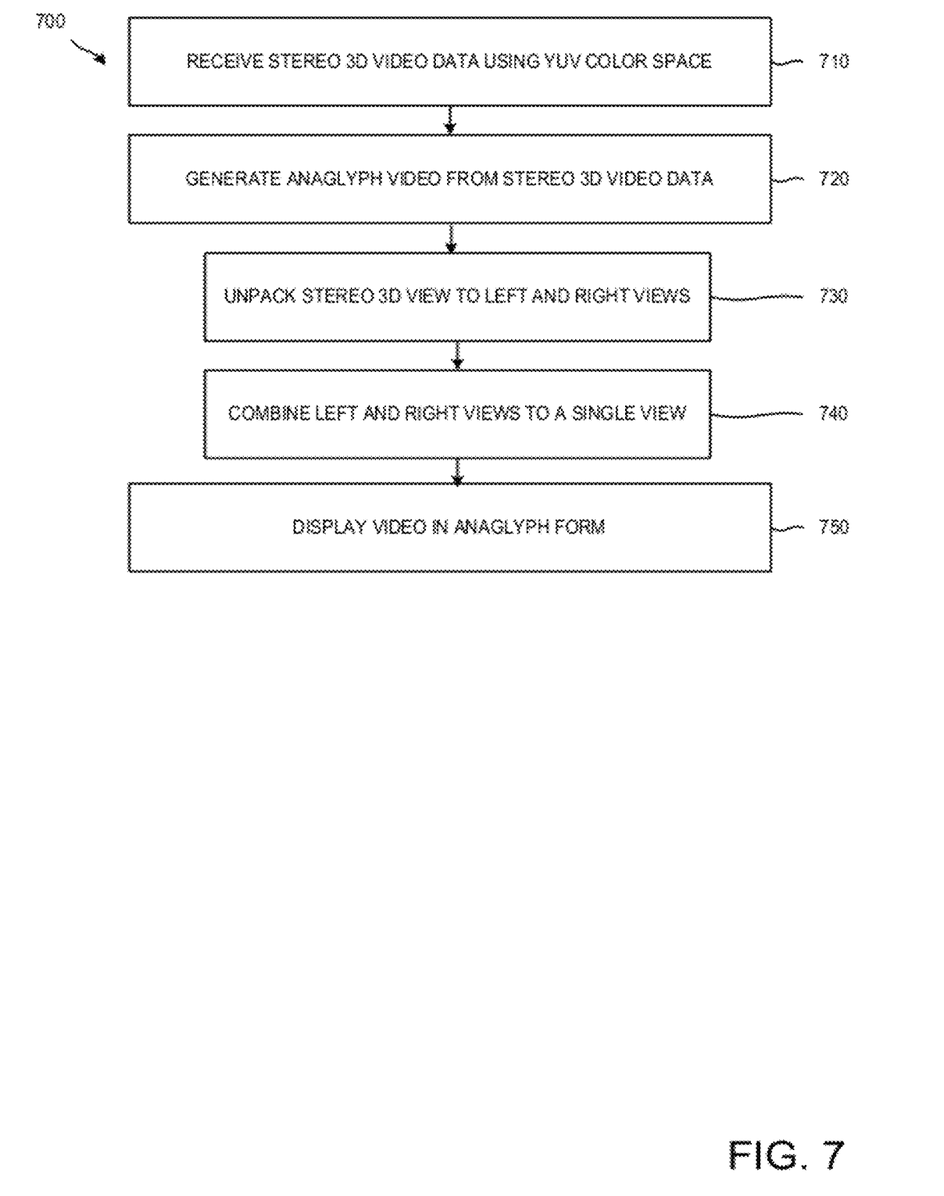
FIG. 7 is a flowchart of an exemplary method of generating anaglyph video data from stereo 3D video data.

FIG. 7 is flowchart of an exemplary method 700 of displaying anaglyph video in place of stereo 3D video. The method 700 can be executed, for example, by a laptop computer streaming stereo 3D video from a cloud-based service provider. At 710, stereo 3D video data employing a YUV color space is received. In the example, the laptop is streaming a 3D movie encoded in a stereo 3D video display format and employing a YUV color space, from the cloud-based service provider. At 720, anaglyph video data is generated from the stereo 3D video data using a computing device. In the example, the desktop generates anaglyph video from the stereo 3D video data. The generation of anaglyph data comprises, at 730, unpacking the stereo 3D video data to a left view and a right view, and, at 740, combining the left and right views into a single view. The anaglyph video data comprises the single view. In the example, the laptop unpacks the stereo 3D video data into left and right views and combines them into a single view. At 750, the video encoded in the stereo 3D video data is displayed in anaglyph form. In the example, the streamed movie is displayed at the laptop display in anaglyph form.

Figure 6B:
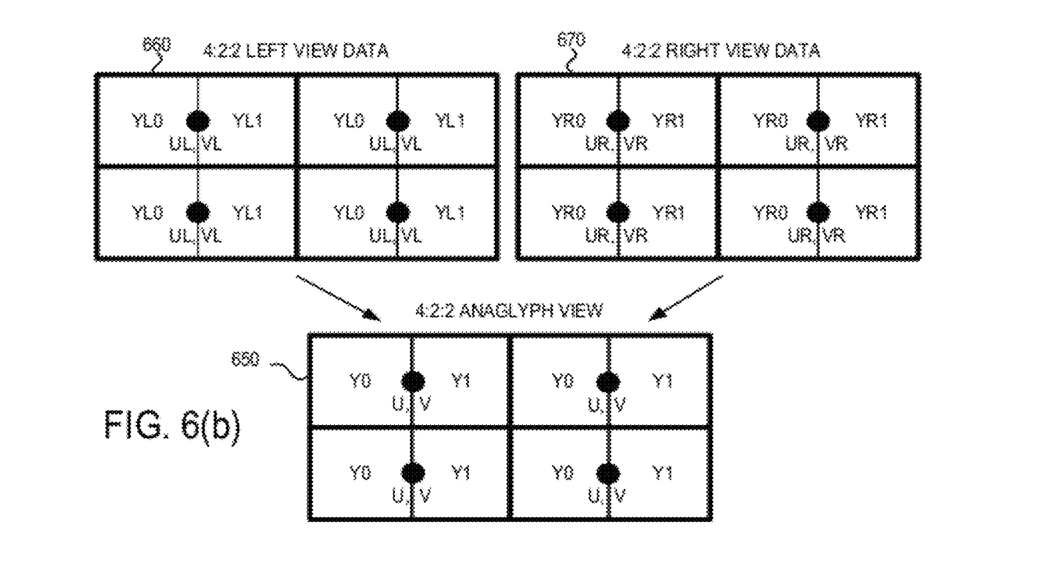

FIG. 6(*b*) shows an exemplary generation of anaglyph video data 650 from stereo 3D data employing a YUV color space and 4:2:2 chroma subsampling, such as stereo 3D video data complying with the H.264 standard Fidelity Range Extensions. Anaglyph video data 650 employing a YUV color space and using 4:2:2 chroma subsampling can be generated from left view data 660 and right view data 670 unpacked from the stereo 3D video data using the following equation:

$$\begin{pmatrix} Y0 \\ Y1 \\ U \\ V \end{pmatrix} = ML\_422 \begin{pmatrix} YL0 \\ YL1 \\ UL \\ VL \end{pmatrix} + MR\_422 \begin{pmatrix} YR0 \\ YR1 \\ UR \\ VR \end{pmatrix},$$

wherein YL0 and YL1 are luma samples of the left view data, UL and VL are chroma samples of the left view data, YR0 and YR1 are luma samples of the right view data, UR and VR are chroma samples of the right view data, Y0 and Y1 are luma samples of the anaglyph video data, U and V are chroma samples of the anaglyph video data; and ML\_422 and MR\_422 are anaglyph transform matrices having the form:

$$Mx\_422 = \begin{pmatrix} a & 0 & b & c \\ 0 & a & b & c \\ d0 & d1 & e & f \\ g0 & g1 & h & i \end{pmatrix},$$

wherein a, b, c d0, d1, e, f, g0-g1, h and i are anaglyph transform matrix coefficients.

Although generation of anaglyph video data 610 and 650 encoded using a YUV color space and using 4:2:2 or 4:2:0 chroma subsampling schemes are discussed herein, the disclosed methods are not limited thereby. The video processor 320 can generate anaglyph data from stereo 3D video data using other chroma sampling schemes, chroma sampling arrangements or employing other color spaces in a similar fashion.

Returning to FIG. 3, the display 330 can be a display that is accessible to a computing device. The display 330 can be an integrated display such as a smartphone touch screen or a laptop LCD display, an external monitor or television in communication with the computing device, or any remote display accessible to the computing device via the cloud. The display 330 can comprise any video pipeline hardware and software located downstream from the video processor 320. For example, the display can include device drivers, video cards, rendering engines, digital signal processors, graphics processing units and the like.

Any of the computer-executable instructions for implementing the disclosed techniques as well as any data created and used during implementation of the disclosed embodiments can be stored on one or more computer-readable media (e.g., non-transitory computer-readable media, such as one or more optical media discs, volatile memory components (e.g., DRAM or SRAM), or nonvolatile memory components (e.g., as flash memory or hard drives)) and executed on a computer (e.g., any commercially available computer, including smart phones or other mobile computing devices that include computing hardware). The computer-executable instructions can be part of, for example, a dedicated software application or a software application that is accessed or downloaded via a web browser or other software applications (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Having illustrated and described the principles of the illustrated embodiments, the embodiments can be modified in various arrangements while still remaining faithful to the concepts described above. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of displaying anaglyph video in place of stereo 3D video, the method comprising:
   receiving via a video pipeline, stereo 3D video data employing a YUV color space, wherein the video pipeline comprises a plurality of video pipeline components, wherein the plurality of video pipeline components comprise at least a video processor and a display;
   using a computing device, generating anaglyph video data from the stereo 3D video data, the generating comprising:
      unpacking the stereo 3D video data to a left view and a right view; and
      combining the left view and the right view into a single view, the anaglyph video data comprising the single view, wherein:
         the combining uses anaglyph transform matrices that correspond to a configuration of the plurality of video pipeline components associated with the received stereo 3D video data;
         coefficients for the anaglyph transform matrices are selected based on one or more configuration characteristics associated with the plurality of video pipeline components, the one or more configuration characteristics including at least one of a chroma sampling scheme and a chroma sampling arrangement, and configuration characteristics of one or more of a video capture device, a display and/or viewing glasses; and
         the resulting anaglyph video data has at least a minimum display aperture and a pixel aspect ratio to be displayed on the display; and
      displaying video encoded in the stereo 3D video data in anaglyph form.

2. The method of claim 1, comprising:
   adjusting one or both of minimum display aperture and pixel aspect ratio associated with the received stereo 3D video data using the anaglyph transform matrices.

3. The method of claim 1, wherein the anaglyph transform matrices include anaglyph transform matrix coefficients that depend on characteristics of components within the video pipeline.

4. The method of claim 3, wherein the video encoded in the stereo 3D video data is displayed on a display and at least one of the anaglyph transform matrix coefficients depend on one or more characteristics of the following: the display, a video capture device used to capture the video encoded in the stereo 3D video data and anaglyph glasses used to view the display.

5. The method of claim 1, the method further comprising:
   receiving one or more modified anaglyph transform matrix coefficients in response to a change in the video pipeline configuration; and
   generating the anaglyph video data using the one or more modified anaglyph transform matrix coefficients.

6. The method of claim 5, wherein the change in the video pipeline configuration comprises a change in a display, a change in a video capture device or a change in anaglyph glasses.

7. The method of claim 5, further comprising receiving the one or more modified anaglyph transform matrix coefficients from a component of the video pipeline.

8. The method of claim 7, wherein the one or more modified anaglyph transform matrix coefficients are for use in generating anaglyph video data using a first color space and chroma sampling combination, the method further comprising transforming the one or more modified anaglyph transform matrix coefficients for use in generating anaglyph video data using a second color space and chroma sampling combination.

9. The method of claim 1, wherein the stereo 3D video data employs 4:2:0 chroma subsampling and the anaglyph video data is generated using the following formula:

$$\begin{pmatrix} Y0 \\ Y1 \\ Y2 \\ Y3 \\ U \\ V \end{pmatrix} = ML \begin{pmatrix} YL0 \\ YL1 \\ YL2 \\ YL3 \\ UL \\ VL \end{pmatrix} + MR \begin{pmatrix} YR0 \\ YR1 \\ YR2 \\ YR3 \\ UR \\ LR \end{pmatrix},$$

wherein YL0-YL3 are luma samples of the left view, UL and VL are chroma samples of the left view; YR0-YR3 are luma samples of the right view; UR and VR are chroma samples of the right view, Y0-Y3 are luma samples of the anaglyph video data; and U and V are chroma samples of the anaglyph video data; ML and MR are anaglyph transform matrices having the form $$Mx = \begin{pmatrix} a & 0 & 0 & 0 & b & c \\ 0 & a & 0 & 0 & b & c \\ 0 & 0 & a & 0 & b & c \\ 0 & 0 & 0 & a & b & c \\ d0 & d1 & d2 & d3 & e & f \\ g0 & g1 & g2 & g3 & h & i \end{pmatrix},$$

wherein a, b, c, d0-d3, e, f, g0-g3, h and i are anaglyph transform matrix coefficients.

10. The method of claim 1, wherein the stereo 3D video data is encoded using 4:2:2 chroma subsampling and the anaglyph video data is generated using the following formula:

$$\begin{pmatrix} Y0 \\ Y1 \\ U \\ V \end{pmatrix} = ML \begin{pmatrix} YL0 \\ YL1 \\ UL \\ VL \end{pmatrix} + MR \begin{pmatrix} YR0 \\ YR1 \\ UR \\ VR \end{pmatrix},$$

wherein YL0 and YL1 are luma samples of the left view, UL and VL are chroma samples of the left view, YR0 and YR1 are luma samples of the right view, UR and VR are chroma samples of the right view, Y0 and Y1 are luma samples of the anaglyph video data, U and V are chroma samples of the anaglyph video data; and ML and MR are anaglyph transform matrices having the form:

$$Mx = \begin{pmatrix} a & 0 & b & c \\ 0 & a & b & c \\ d0 & d1 & e & f \\ g0 & g1 & h & i \end{pmatrix},$$

wherein a, b, c d0, d1, e, f g0, g1, h and i are anaglyph transform matrix coefficients.

11. A method for selecting a video display format, the method comprising:
receiving via a video pipeline, stereo 3D video data employing a YUV color space at a computing device, wherein the video pipeline comprises a plurality of video pipeline components, wherein the plurality of video pipeline components comprise at least a video processor and a display;
selecting the video display format from at least two of the following formats: stereo 3D video, anaglyph video and monoscopic video, the selecting based on availability of at least one processing resource for processing the received stereo 3D video data into the selected video display format, wherein the availability is determined prior to the processing, and the processing is based on one or more configuration characteristics associated with the plurality of video pipeline components, wherein:
the one or more configuration characteristics including at least one of a chroma sampling scheme and a chroma sampling arrangement, and configuration characteristics of one or more of a video capture device, a display and/or viewing glasses; and
the resulting video data in the selected video display format has at least a minimum display aperture and a pixel aspect ratio to be displayed on the display; and
displaying video encoded in the stereo 3D video data in the selected video display format.

12. The method of claim 11, wherein the selecting comprises selecting the video display format based on characteristics of components within a video pipeline.

13. The method of claim 11, wherein the video encoded in the stereo 3D video data is displayed on a display and the selecting comprises selecting the video display format based on characteristics of the display.

14. The method of claim 11, wherein the selecting comprises selecting the video display format based on whether the computing device is communicatively coupled to 3D viewing glasses.

15. The method of claim 11, wherein the selected video display format is a first video display format, the method further comprising:
selecting a second video display format that is different from the first video display format; and
displaying the video encoded in the stereo 3D video data in the second video display format.

16. The method of claim 15, wherein the second video display format is selected automatically in response to a change in the display.

17. The method of claim 11, further comprising:
if the selected video display format is anaglyph video, converting the stereo 3D video data to anaglyph video data; and
if the selected video display format is monoscopic video, converting the stereo 3D video data to monoscopic video data.

18. The method of claim 11, further comprising receiving user input indicating a user-selected video display format, wherein the selecting comprises selecting the user-selected video display format as the video display format.

19. One or more computer-readable memory devices or storage devices storing computer-executable instructions for causing a computing device to perform a method, the method comprising:
receiving via a video pipeline, stereo 3D video data employing a YUV color space, wherein the video pipeline comprises a plurality of video pipeline components, wherein the plurality of video pipeline components comprise at least a video processor and a display;
using a computing device, generating anaglyph video data from the stereo 3D video data, the generating comprising:
unpacking the stereo 3D video data to a left view and a right view; and
combining the left view and the right view into a single view, the anaglyph video data comprising the single view, wherein:
the combining uses anaglyph transform matrices that correspond to a configuration of the plurality of video pipeline components associated with the received stereo 3D video data;
coefficients for the anaglyph transform matrices are selected based on one or more configuration characteristics associated with the plurality of video pipeline components, the one or more configuration characteristics including at least one of a chroma sampling scheme and a chroma sampling arrangement, and configuration characteristics of one or more of a video capture device, a display and/or viewing glasses; and
the resulting anaglyph video data has at least a minimum display aperture or a pixel aspect ratio to be displayed on the display; and
displaying video encoded in the stereo 3D video data in anaglyph form.

20. The one or more computer-readable memory devices or storage devices of claim 19, wherein the stereo 3D video data is encoded using 4:2:0 chroma subsampling and the anaglyph video data is generated using the following formula:

$$\begin{pmatrix} Y0 \\ Y1 \\ Y2 \\ Y3 \\ U \\ V \end{pmatrix} = ML \begin{pmatrix} YL0 \\ YL1 \\ YL2 \\ YL3 \\ UL \\ VL \end{pmatrix} + MR \begin{pmatrix} YR0 \\ YR1 \\ YR2 \\ YR3 \\ UR \\ LR \end{pmatrix},$$

wherein YL0-YL3 are luma samples of the left view, UL and VL are chroma samples of the left view; YR0-YR3 are luma samples of the right view; UR and VR are chroma samples of the right view, Y0-Y3 are luma samples of the anaglyph video data; and U and V are chroma samples of the anaglyph video data; and ML and MR are anaglyph transform matrices corresponding to a configuration of a video pipeline and have the form:

$$Mx = \begin{pmatrix} a & 0 & 0 & 0 & b & c \\ 0 & a & 0 & 0 & b & c \\ 0 & 0 & a & 0 & b & c \\ 0 & 0 & 0 & a & b & c \\ d0 & d1 & d2 & d3 & e & f \\ g0 & g1 & g2 & g3 & h & i \end{pmatrix},$$

wherein a, b, c, d0-d3, e, f, g0-g3, h and i are anaglyph transform matrix coefficients that depend on one or more characteristics of the following: a display, a video capture device and anaglyph glasses used for viewing the display, the method further comprising:

modifying at least one of the anaglyph transform matrix coefficients in response to a change in the video pipeline configuration; and generating the anaglyph video data using the modified anaglyph transform coefficients.

* * * * *